United States Patent [19]
Nishinou

[11] Patent Number: 5,625,850
[45] Date of Patent: Apr. 29, 1997

[54] METHOD OF CONTROLLING FILM ADVANCE

[75] Inventor: Naoyuki Nishinou, Saitama, Japan

[73] Assignee: Fuji Photo Film Co., Ltd., Kanagawa, Japan

[21] Appl. No.: 637,561

[22] Filed: Apr. 25, 1996

Related U.S. Application Data

[63] Continuation of Ser. No. 262,319, Jun. 17, 1994, abandoned.

[30] Foreign Application Priority Data

Jun. 18, 1993 [JP] Japan ..................... 5-148014

[51] Int. Cl.⁶ .................................................. G03B 1/00
[52] U.S. Cl. .......................................... 396/269; 396/397
[58] Field of Search .......................... 354/213, 217, 354/218, 173.1, 173.11, 105, 106; 396/269, 397, 268, 273, 387

[56] References Cited

U.S. PATENT DOCUMENTS

| | | | |
|---|---|---|---|
| 4,996,549 | 2/1991 | Yamaguchi | 354/173.11 |
| 5,130,728 | 7/1992 | Goto et al. | 354/105 |
| 5,247,321 | 9/1993 | Kazami | 354/106 |
| 5,323,198 | 6/1994 | Tabata et al. | 354/173.1 |
| 5,345,286 | 9/1994 | Stiehler | 354/173.1 |
| 5,410,380 | 4/1995 | Kawamura et al. | 354/213 |
| 5,422,694 | 6/1995 | Yoshida et al. | 354/106 |
| 5,481,331 | 1/1996 | Cocca et al. | 354/412 |
| 5,504,546 | 4/1996 | Kazami et al. | 354/106 |

FOREIGN PATENT DOCUMENTS

| | | | |
|---|---|---|---|
| 4219739 | 8/1992 | Japan | 354/480 |
| 6-82905 | 3/1994 | Japan | 354/480 |

*Primary Examiner*—Safet Metjahic
*Assistant Examiner*—Daniel Chapik
*Attorney, Agent, or Firm*—Sughrue, Mion, Zinn, Macpeak & Seas

[57] ABSTRACT

When a photographic film cassette is loaded in a camera and a rear lid of the camera is closed, a current adjusting circuit supplies a light emitting element of a photo-sensor with a drive current while stepwise increasing the value of the drive current and comparing a maximum value of the output signal from the photo-sensor with a predetermined maximum level. The value of the drive current, at which the maximum value of the output signal reaches the predetermined maximum level, is stored as an optimum current value. Thereafter, photographic film is advanced from the cassette to position each exposure frame in an exposure aperture of the camera, with reference to the position of perforations formed in association with the exposure frames. The position of each perforation is determined based on a rising edge of the output signal from the photo-sensor while driving the light emitting element at the optimum current value.

6 Claims, 5 Drawing Sheets

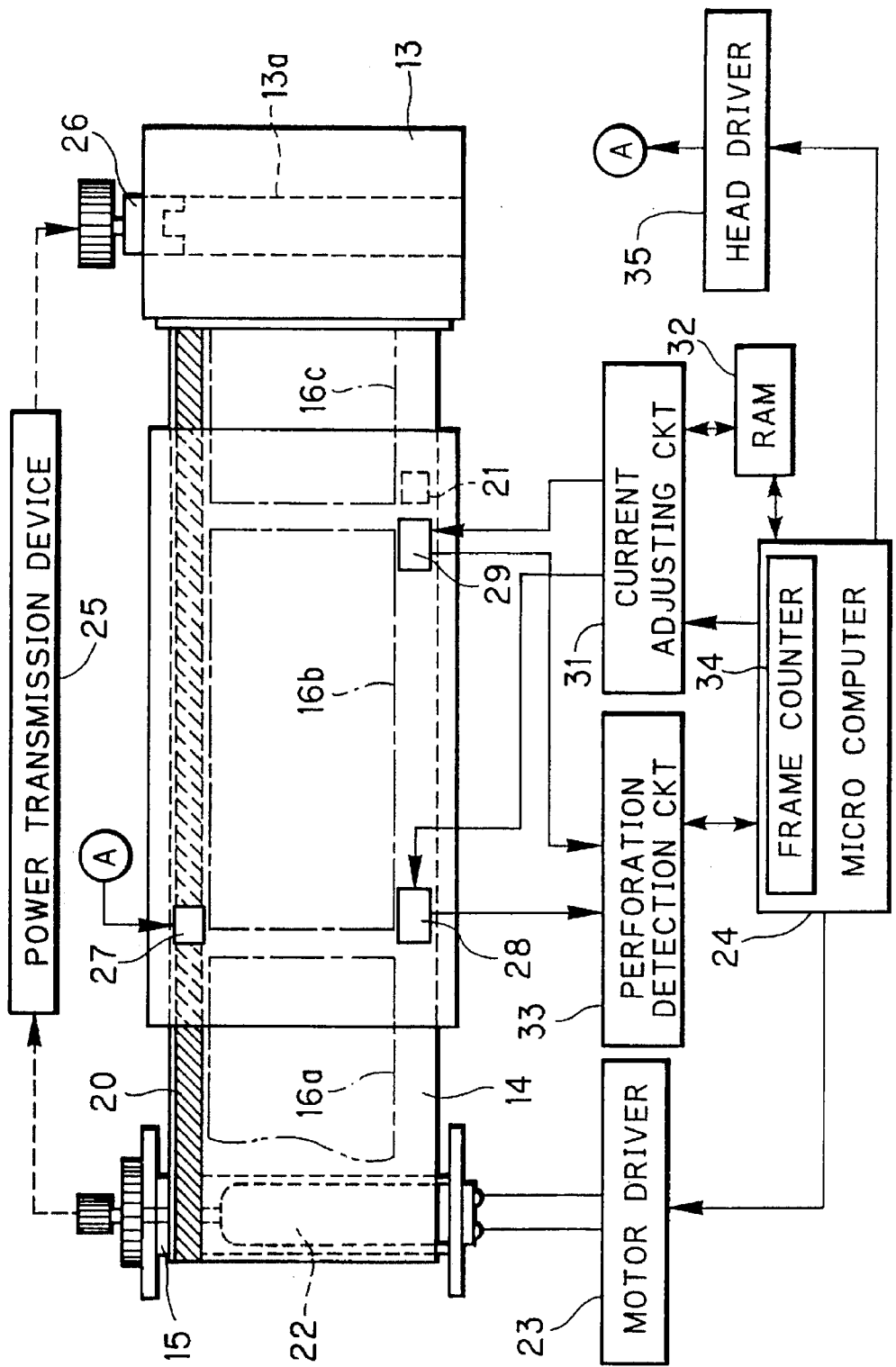

METHOD OF CONTROLLING FILM ADVANCE

This is a Continuation of Application No. 08/262,319 filed Jun. 17, 1994.

BACKGROUND OF THE INVENTION

1. Field of the Invention

The present invention relates to a perforation detector for use in a camera for detecting control signals used in advancing and positioning a photographic film.

2. Related Art

In a conventional ISO 135-type photographic film, eight perforations are formed in either side of each exposure frame or picture frame thereof, so that the photographic film may be advanced by one-frame by transporting the photographic film an amount corresponding to eight perforations. To count the perforations of the photographic film, a photosensor of reflection type or transmission type is convenient.

Because the one-frame advancing, that is, the positioning of each exposure frame merely effects the spacing between the exposure frames, and the spacing may vary in conventional cameras, it has not been necessary to control a start and stop of the film advancing with a high accuracy. Therefore, it has been sufficient to count the number of photo-electric pulses which are outputted from the photo-sensor, one for each perforation.

Recently, a camera having a magnetic recording head has been proposed for use with a photographic film that has a magnetic recording layer for allowing the recording of various data thereon during the film advancing. Because the data is intended to be utilized for printing, it is necessary to exactly correlate the data recording position to each exposure frame.

It is also known in the art to provide a magnetic recording layer along one lateral side of the exposure frames on a photographic filmstrip, and to provide the perforations along the other lateral side of the exposure frames, allocating one or two perforations to each exposure frame. Thereby, it becomes possible to exactly determine the position of the exposure frame as well as the data recording position for each exposure frame with reference to the one or two perforations.

To determine the data recording position with reference to the perforation, the camera is required to precisely determine the position of the perforation. However, as described above, the perforation detector of the conventional camera can merely detect the number of the perforations passing by the detector. To determine the position of the perforation precisely, it is desirable to detect a leading or trailing margin of each perforation when the margin passes by a predetermined detection position.

The margin of the perforation should theoretically be determined based on the curve of photo-electric signal outputted from a light receiving element of a photo-sensor. However, because the level of the photo-electric signal may be change in accordance with the original difference between the individual photo-sensors. Moreover, because of debris, or the like accumulating on the light projection surface and the light reception surface of the photo-sensor, the output level of the photo-sensor is unavoidably lowered with time.

In the case of a reflection type photo-sensor, a reflection plate is disposed on the opposite side of the photographic film from the light emitting element and the light receiving element, to reflect light passing through the perforation toward the light receiving element to output a distinctively high level signal compared with an output signal detected for light reflected from a non-perforated portion of the photographic film. Therefore, the same problem as above would occur when the reflectance of the reflection plate is lowered with time or for other reasons.

SUMMARY OF THE INVENTION

In view of the foregoing, a primary object of the present invention is to provide a perforation detector which always precisely detects a margin of each perforation independently of the original difference between the individual sensors and the debris on the sensor as well as the aging of the sensor.

To achieve the above object, in a perforation detector having a light emitting element, a light receiving element, and a detection circuit for outputting a detection signal when the output signal from the light receiving element reaches a predetermined detection level, the present invention provides a comparing device for comparing a maximum value of the output signal from the light receiving element with a predetermined maximum level that is higher than the detection level, and an adjusting circuit for adjusting the drive current by stepwise increasing the value of the drive current until the maximum value of the output signal reaches the predetermined maximum level, and determining the last value of the drive current as an optimum current value.

By driving the light emitting element with the drive current of the optimum value, the maximum value of the sensor output signal is maintained in the constant maximum level.

According to a preferred embodiment of the present invention, the drive current of the light emitting element is adjusted while a photographic filmstrip is disposed away from the light emitting and receiving elements. In this embodiment, it is necessary to provide a memory for storing the optimum current value.

Because the sensor drive current is so adjusted that the maximum value of the output signal from the light receiving element may be maintained at a predetermined level, the output level of the photo-sensor is not affected by the difference between the individual photo-sensors nor by aging of the photo-sensor. Therefore, it is possible to discriminate the margin of each perforation at a high accuracy with reference to the constant detection level.

BRIEF DESCRIPTION OF THE DRAWINGS

Other objects and advantages of the present invention will become apparent in the following detailed description of the preferred embodiments when read in connection with the accompanying drawings, wherein like reference numerals designates like or corresponding parts throughout the several views, and wherein:

FIG. 2 is a diagram illustrating a perforation detector according to a preferred embodiment of the invention;

DETAILED DESCRIPTION OF THE PREFERRED EMBODIMENT

Figure 1:
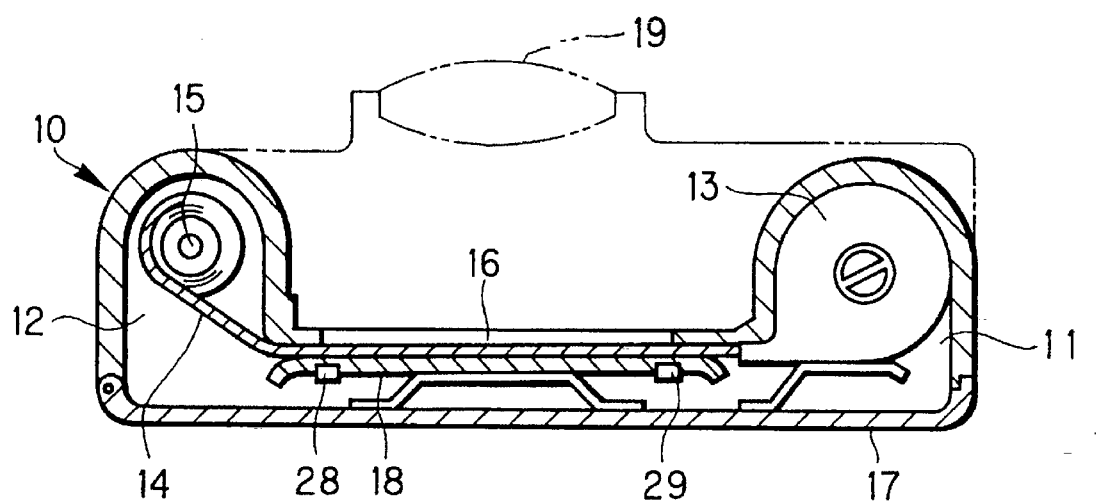
FIG. 1 is a schematic view of essential parts of a camera for use with a perforation detector of the present invention.

Referring to FIG. 1, a camera 10 has a cassette chamber 11 and a film roll chamber 12. The cassette chamber 11 is loaded with a photographic film cassette 13, and the film roll chamber 12 is provided with a take-up spool 15 for winding up a photographic film 14 from the cassette 13. An exposure aperture 16 is formed between the cassette chamber 11 and the film roll chamber 12, for defining an exposure frame of the photographic film 14. A rear lid 17 has a film pressing plate 18 resiliently mounted on the inside thereof, so as to support or confine a portion of the photographic film 14 from the back which is positioned behind the exposure aperture 16. Thereby, the photographic film 14 is positioned in a direction of an optical axis of a taking lens 19.

The cassette 13 for use in the present embodiment is of a type wherein the photographic film 14 is entirely located within the cassette 13 such that a film leader may be advanced to the outside of the cassette 13 by rotating a spool 13a of the cassette 13 in an unwinding direction. As shown in FIG. 2, the photographic film 14 has a strip of magnetic recording layer 20 applied on a back side along an edge of the photographic film 14. Along another edge of the photographic film 14, a perforation 21 is formed in association with each exposure frames 16a, 16b, 16c . . . to be positioned and exposed in the exposure aperture 16.

The take-up spool 15 is rotated by a motor 22 mounted inside the spool 15. The motor 22 is driven by a motor driver 23 under the control of a micro computer 24. The rotation of the motor 22 is transmitted through a power transmission device 25 to a fork 26 which is engaged with the spool 13a of the cassette 13. The motor 22 is rotated in a forward direction to wind up the photographic film 14 onto the take-up spool 15, and is rotated in a reverse direction to rewind the photographic film 14 into the cassette 13.

A magnetic head 27 is secured to the film pressing plate 18 so as to contact the magnetic recording layer 20 when the rear lid 18 is closed and the photographic film 14 is advanced from the cassette 13 to the take-up spool 15. The magnetic head 27 records exposure control data, such as shutter speed and aperture size, on the magnetic recording layer 20 in association with each exposure frame.

Figure 3:
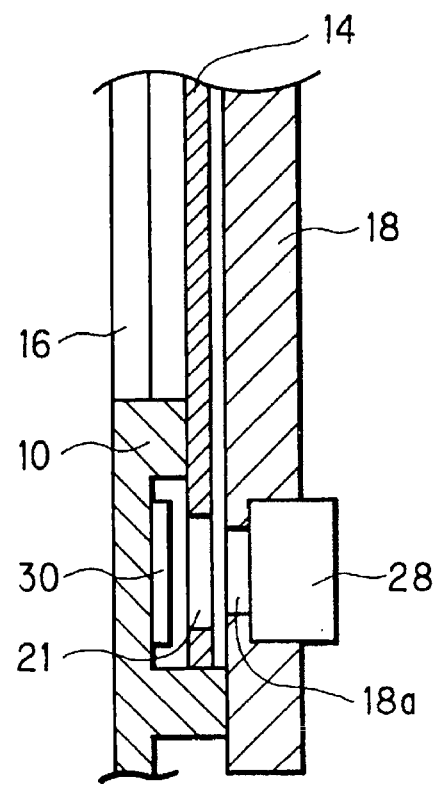
FIG. 3 is a sectional view of a first photo-sensor of the perforation detector shown in FIG. 2.

The rear lid 18 also has two sensors 28 and 29 disposed in opposition to a path of the perforations 21 for determining the position of the photographic film 14 in the film advancing direction. The first sensor 28 is disposed in the proximity to a leading margin of the exposure aperture 16 in the film advancing direction, whereas the second sensor 29 is disposed in the proximity to a trailing margin of the exposure aperture 16. For example, the first and second sensors 28 and 29 are reflective photo-sensors each constituted of an ultra-red LED and a photo-transistor, and a reflection plate 30 is disposed in opposite side of the photographic film 14 from each of the sensors 28 and 29. The photo-transistor receives ultra-red light projected from the LED and reflected from the reflection plate 30, and outputs a signal whose level depends on the received light amount. As shown in FIG. 3, the first photo-sensor 28 is secured to the inside surface of the film pressing plate 18 and may face the perforations 21 through an opening 18a. The second photo-sensor 29 has the same construction as the first photo-sensor 28, so the detailed description thereof is omitted.

Figure 4:
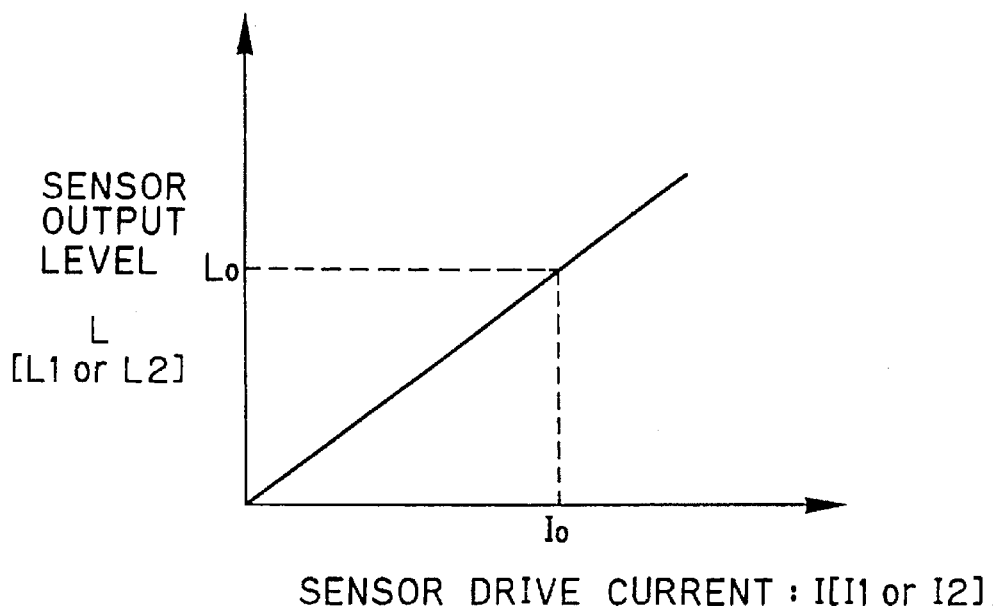
FIG. 4 is a graph illustrating a curve of sensor output level in relation to sensor drive current.

As shown in FIG. 4, the output level L of a photo-sensor changes in proportion to the value of drive current I supplied to the light emitting element thereof. In order to set the maximum value of the output signal L1 or L2 from the light receiving element, that is, the photo-transistor, of the photo-sensor 28 or 29 at a predetermined maximum level Lo, the value of drive current I1 or I2 for the light emitting element, that is, the LED, of the photo-sensor 28 or 29 is adjusted by a current adjusting circuit 31. The current adjusting circuit 31 is activated in response to a current adjusting signal from the micro-computer 24 which totally controls the camera 10 according to a sequence. An optimum values Io1 and Io2 of the sensor drive current I1 and I2, which are determined by the current adjusting circuit 31, are stored in RAM (or E$^2$PROM) 32.

Figure 5:
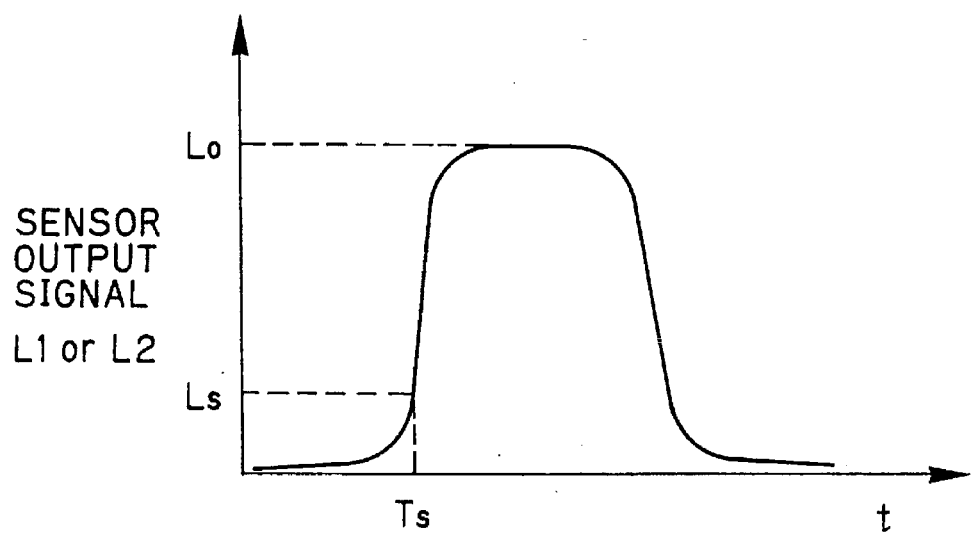
FIG. 5 is a timing chart of a sensor output signal.

The output signals L1 and L2 from the photo-sensors 28 and 29 are sent to a perforation detection circuit 33 to detect the perforation 21. As shown in FIG. 5, the output signal L1 or L2 from the photo-sensor 28 or 29 is in a low level when the perforation 21 is not opposed to the photo-sensor 28 or 29, and jumps up to the predetermined high level Lo when the perforation 21 is opposed to the photo-sensor 28 or 29, respectively. The perforation detection circuit 33 outputs an edge detection signal to the micro-computer 24 at the moment Ts when the output signal L1 or L2 rises above a predetermined edge detection level Ls. The micro-computer 24 outputs a stop signal to the motor driver 23 in response to an edge detection signal detected from the output signal of the first photo-sensor 28. On the other hand, when the micro-computer 24 receives an edge detection signal detected from the output signal of the second photo-sensor 29, the micro-computer 24 drives the magnetic head 27 through a head driver 35.

Figure 6:
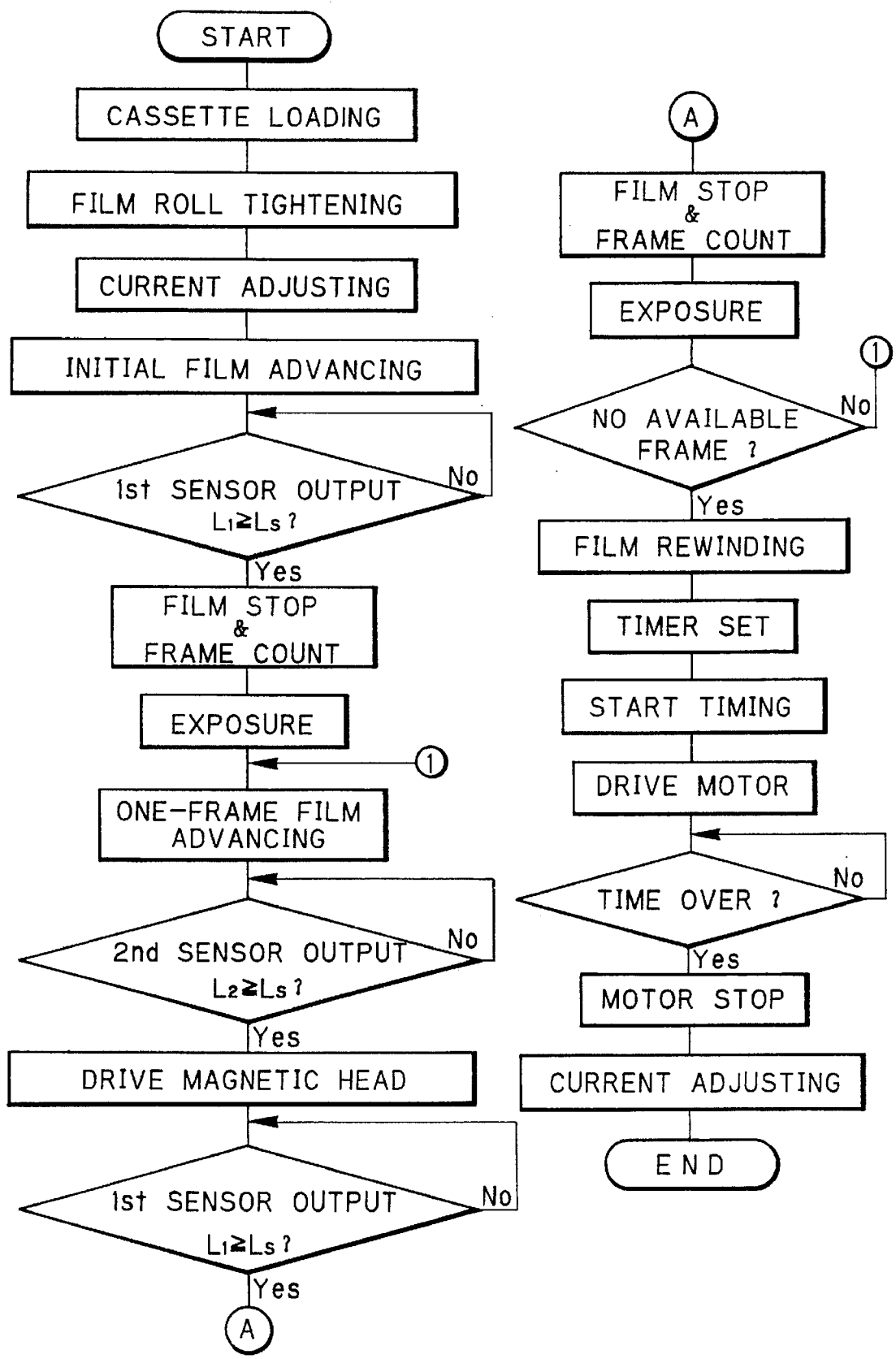
FIG. 6 is a flow chart illustrating a control sequence of the camera shown in FIG. 1.

The operation of the above-described camera 10 will be described with reference to FIGS. 6 and 7 so far as the present invention is concerned.

As soon as the rear lid 17 is closed after the cassette 13 is loaded in the cassette chamber 11, the micro-computer 24 tightens the film roll for a time. The photographic film 14 contained in the cassette 13 is tightening on the spool 13a of the cassette 13 by rotating the spool 13a in the rewinding direction, that is, by rotating the motor 22 in the reverse direction, so that the film leader may be surely advanced to the outside of the cassette 13 when the motor 22 is rotated in the forward direction.

After the motor 22 stops rotating for the film roll operation, the micro-computer 24 effects the current adjusting. First, the micro-computer 24 outputs a current adjusting signal to the current adjusting circuit 31.

Figure 7:
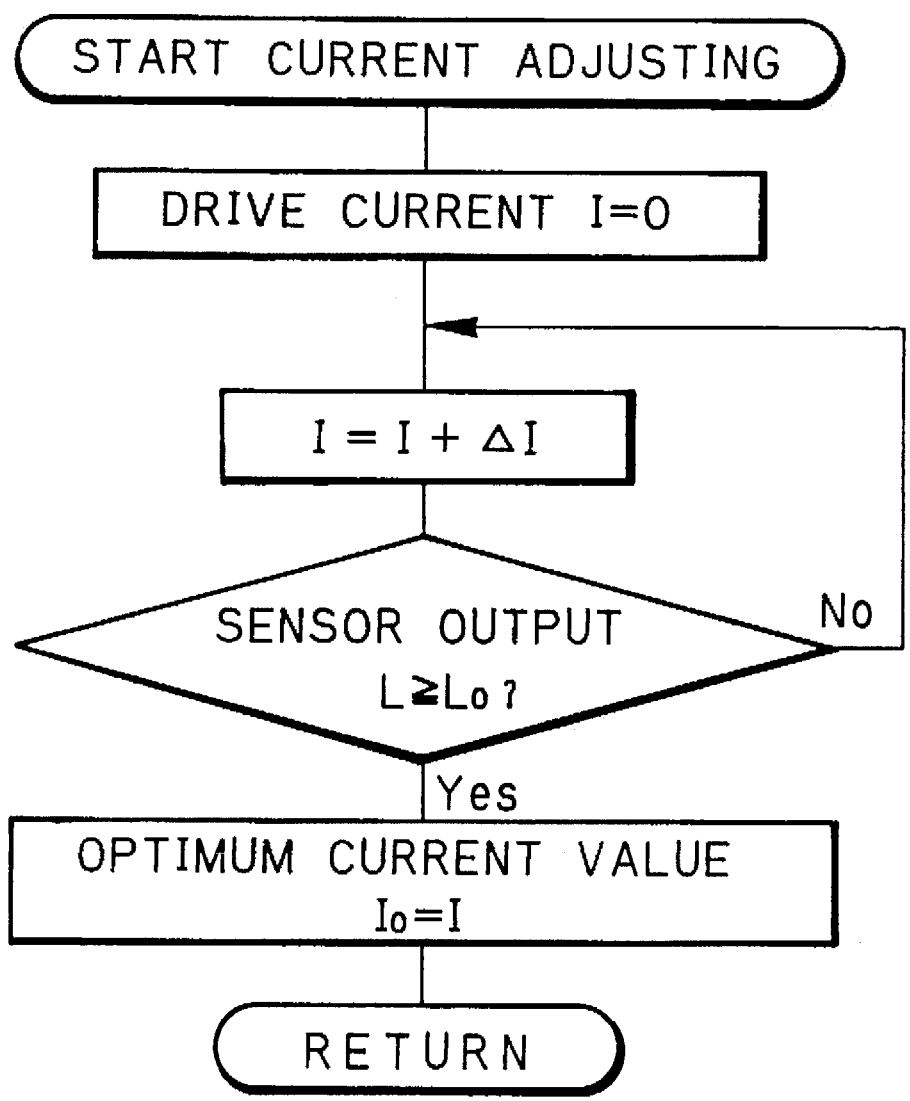
FIG. 7 is a flow chart illustrating a sub routine for current-adjusting according to an embodiment of the present invention.

Upon receipt of the current adjusting signal, the current adjusting circuit 31 starts current-adjusting according to a sub-routine shown in FIG. 7. The current adjusting circuit 31 supplies the first photo-sensor 28 with the drive current 17 while increasing the value of the drive current I1 for the first photo-sensor 28 from zero in increments of 1, and detects and compares the output level L1 of the first photo-sensor 28 with the predetermined level Lo. In this stage, because the photographic film 14 is entirely located within the cassette 13 and not disposed in front of the photo-sensors 28 and 29, the light from the photo-sensors 28 and 29 is reflected from the reflection plates 30, as if the perforation 21 is opposed to the photo-sensor 28 or 29.

When the output level L1 reaches the predetermined level Lo, the current adjusting circuit 31 stops increasing the drive current I1, and stores the last value of the drive current I1 in the RAM 32 as an optimum current value Io1 for the first photo-sensor 28. An optimum current value Io2 for the second photo-sensor 29 is determined and stored in the RAM 32 in the same way as the optimum current value Io1. After the values Io1 and Io2 are stored in the RAM 32, the micro-computer 31 stops supplying the photo-sensors 28 and 29, to complete the current adjusting.

Next, the micro-computer 31 effects an initial film advancing for positioning the first exposure frame of the photographic film 14 in the exposure aperture 16, wherein the motor 22 is driven by the motor driver 23 to rotate forwardly. The rotational movement is transmitted to the fork 26 through the power transmission device 25, so that the spool 13a is rotated to advance the photographic film 14 to the outside of the cassette 13 toward the take-up spool 15. Thereby, the photographic film 14 passes the front of the photo-sensors 28 and 29. Simultaneously, the micro-computer 31 reads the optimum current value Io1 for the first photo-sensor 28 from the RAM 32, and supplies the first photo-sensor 28 with the drive current I1 having the value Io1.

Then, the LED of the first photo-sensor 28 emits light and the photo-transistor outputs the signal L1 representative of the light amount received thereon. Because the drive current I1 for the first photo-sensor 28 is so adjusted that the maximum value of the output signal L1 of the first photo-sensor 28 reaches the predetermined level Lo when the first photo-sensor 28 receives light reflected from the reflection plate 30, the output signal L1 rises up to the predetermined level Lo when the perforation 21 is opposed to the first photo-sensor 28. As shown in FIG. 5, when a non-perforated portion of the photographic film 14 is opposed to the first photo-sensor 28, the first photo-sensor 28 outputs the signal L1 in a low level less than the edge detection level Ls. The output level L1 jumps up to the predetermined level Lo in a moment, when a leading margin of the perforation 21 just comes to the first photo-sensor 28. When a trailing margin of the perforation 21 passes by the first photo-sensor 28, the output level L1 drops down from the level Lo.

The output signal L1 from the first photo-sensor 28 is sent to the perforation detection circuit 33, which outputs an edge detection signal, representative of a rising edge of the sensor output signal, to the micro-computer 24 at a moment Ts1 when the output signal L1 rises above the edge detection level Ls. Because the edge detection level Ls is set lower than the maximum output level Lo of the first photo-sensor 28, the edge detection signal is outputted without delay from the time when the leading margin of the perforation 21 just comes to the first photo-sensor 28. In response to the first edge detection signal, the micro-computer 24 outputs a stop signal to the motor driver 23 to stop advancing the photographic film 14, and counts up a counter 34 by one. In this way, the first exposure frame 16a is positioned in the exposure aperture 16, so that the camera 10 is ready for an exposure.

After the exposure, an exposure end signal is inputted in the micro-computer 24 to start one-frame film advancing. For the one-frame film advancing, the photo-sensors 28 and 29 are driven by the drive currents L1 and L2 of the optimum values Lo1 and Lo2, and the motor 22 is driven to rotate forwardly. Thereby, the photographic film 14 is wound on the take-up spool 15 and an unexposed portion of the photographic film 14 is withdrawn from the cassette 13. In the mean time, the perforation 21 formed in correspondence with the leading margin of the second exposure frame 16b gets to the first photo-sensor 28 after passing by the second photo-sensor 29. When the perforation 21 passes by the second photo-sensor 29, the output signal L2 from the second photo-sensor 29 jumps up to the predetermined maximum level Lo, and the perforation detection circuit 33 outputs an edge detection signal to the microcomputer 24 at a moment when the output signal L2 goes above the edge detection level Ls. Then, the micro-computer 24 drives the magnetic head 27 through the head driver 35, to record exposure control data about the first exposure frame on the magnetic recording layer 20.

Thereafter when the perforation 21 comes to the first photo-sensor 28 and the output signal L1 rises above the edge detection level Ls, the perforation detection circuit 33 again outputs an edge detection signal to the microcomputer 24. Then, the micro-computer 24 stops the motor 22 and counts up the counter 34 by one. In this way, the second unexposed exposure frame 16b is positioned in the exposure aperture 16. Thereafter, the same procedure as above are repeated after each exposure.

When it is determined with reference to the count of the counter 34 that the exposure of all available exposure frames on the photographic film 14 is complete, the micro-computer 24 starts film rewinding by rotating the motor reversely for a predetermined time so as to rewind the exposed photographic film 14 into the cassette 13. When the photographic film 14 is entirely rewound into the cassette 13, the microcomputer 24 stops the motor 22 and outputs the current adjusting signal to the current adjusting circuit 31 for optimizing the values of the drive currents L1 and L2 for the photo-sensors 28 and 29 again. When optimum current values Lo1 and Lo2 are determined and stored in the RAM 32, the micro-computer 24 terminates the sequence, so that the cassette 13 containing the exposed photographic film 14 may be removed from the camera 10.

Although the current adjusting of the sensor drive current is performed once right after the film loading and twice at the end of exposure of an entire strip of photographic film in the above described embodiment, it is possible to perform the current adjusting after each exposure before one-frame film advancing. For this embodiment, it is necessary to stop the perforation in opposition to the photo-sensor in the exposure position of the photographic film. According to this embodiment, optimum current values Lo1 and Lo2 are determined for every one-frame film advancing, there is no need for such a RAM that stores the optimum current values Lo1 and Lo2.

Although the photo-sensors are secured to the film pressing plate and thus disposed on the back side of the photographic film in the above embodiement, it is possible to secure the photo-sensors to the camera body on the front side of the photographic film while securing the reflection plates to the film pressing plate.

The photo-sensors may be transmission light receptive sensors, other than the reflection light receptive sensors.

Although the current adjusting circuit 31 compares the output level of the photo-sensor with the predetermined maximum level Lo while stepwise increasing the drive current from zero, it is possible to make the current adjusting while increasing the drive current from a reference value at a predetermined rate.

The present invention is applicable to detect the number of perforations. At that case, it is preferable to set a perforation detection level higher than an edge detection level so as to make the output level from the photo-sensor distinctive between the case where the light is reflected from the reflection plate and the case where the light is reflected from the non-perforated portion of the photographic film.

While the present invention has been described in detail with respect to the preferred embodiment shown in the drawings, the present invention should not be limited to the embodiments but, on the contrary, various modifications may be possible without departing from the scope of the appended claims.

What is claimed is:

1. A method of controlling film advance in a camera having a rectangular exposure opening, a cassette chamber and a film take-up chamber disposed on opposite sides of the exposure opening, and a first photosensor disposed in proximity to the exposure opening, the cassette chamber being loaded with a photographic film cassette which is constituted of a photographic film with perforations formed along a longitudinal direction thereof, a spool and a cassette shell holding the spool rotatably therein, the photographic film being secured at its trailing end to the spool and being wound about the spool into a roll to be contained in the cassette shell in a light-tight fashion, the first photo-sensor being adapted to detect perforations of the photographic film and constituted of a light emitting element and a light receiving element, the method comprising the steps of:

A. rotating the spool by a motor for a constant time in a direction to tighten the photographic film on the spool;

B. driving the light emitting element with a drive current while increasing the value of the drive current in a stepwise manner;

C. comparing a maximum value of an output signal from the light receiving element with a predetermined maximum level;

D. determining the last value of the drive current at which a maximum value of the output signal reaches the predetermined maximum level, as an optimum current value;

E. storing the optimum current value in a memory;

F. driving the light emitting element at the optimum current value;

G. rotating the spool by the motor in a second direction opposite to the first direction to advance a leading end of the photographic film out of the cassette shell toward the take-up chamber;

H. generating a detection signal when the output signal from the light receiving element reaches a predetermined detection level which is lower than the predetermined maximum level;

I. stopping rotating the motor when a predetermined number of detection signals are generated, thereby to position an exposure frame of the photographic film behind the exposure opening;

J. exposing the photographic film to form an image on the exposure frame; and

K. repeating steps F to I after step J.

2. A method according to claim 1, wherein perforations of the photographic film are spaced at regular intervals which define the position of each exposure frame of the photographic film in one-to-one relationship, and wherein the predetermined number in step I is 1.

3. A method according to claim 2, wherein the detection level is set to determine a rising edge of the output signal from the light receiving element to determine a leading margin of each perforation in the film advancing direction toward the take-up chamber.

4. A method according to claim 3, wherein the light emitting element and the light receiving elements of the first photosensor are disposed on one side of the path of the perforations, and a reflection plate is disposed on the opposite side of the path of the perforations, so that the light projected from the light emitting element and passing through the perforation is reflected from the reflection plate and received by the light receiving element after passing through the perforation.

5. A method according to claim 1, wherein the camera further has a second photosensor disposed in the path of perforations of the photographic film nearer to the cassette chamber than the first photosensor, and a magnetic head for recording data on a magnetic recording layer of the photographic film, the method further comprises the steps of:

detecting the perforations by the second photosensor while the photographic film is advanced after step F; and starting recording of data of the exposed frame on the magnetic recording layer when the second photosensor detects a given number of perforations.

6. A method according to claim 5, wherein the perforations are spaced at regular intervals which define the position of each exposure frame of the photographic film in one-to-one relationship, and the predetermined number in step I is 1.

* * * * *